(12) United States Patent
Rojas et al.

(10) Patent No.: US 7,313,090 B2
(45) Date of Patent: Dec. 25, 2007

(54) SYSTEMS AND METHODS FOR PROVIDING DATA PACKET FLOW CONTROL

(75) Inventors: Edmundo Rojas, Fort Collins, CO (US); S. Paul Tucker, Ft Collins, CO (US); Mercedes E Gil, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1142 days.

(21) Appl. No.: 10/255,788

(22) Filed: Sep. 26, 2002

(65) Prior Publication Data

US 2004/0062266 A1 Apr. 1, 2004

(51) Int. Cl.
*H04J 1/16* (2006.01)

(52) U.S. Cl. .................. 370/229; 370/235; 370/400

(58) Field of Classification Search ............... None
See application file for complete search history.

(56) References Cited

U.S. PATENT DOCUMENTS

| 5,892,766 | A * | 4/1999 | Wicki et al. ............. 370/412 |
| 6,950,394 | B1 * | 9/2005 | Chou et al. ............. 370/229 |
| 2003/0103450 | A1 * | 6/2003 | Chapman et al. ......... 370/229 |
| 2004/0039986 | A1 * | 2/2004 | Solomon et al. ......... 714/799 |

* cited by examiner

*Primary Examiner*—Chi Pham
*Assistant Examiner*—Phuc Tran (57) ABSTRACT

In general, a system and method for providing data packet flow control is disclosed. Generally, a switch is provided that contains a series of ports, an arbiter and a hub. The arbiter determines an outgoing port, wherein the outgoing port is one port for the series of ports, for transmission of a data packet received by the switch, determines whether the outgoing port is available to receive the received data packet, and regulates transmission of the received data packet to a destination end node. The hub provides a point-to-point connection between any two of the series of ports and the arbiter.

19 Claims, 9 Drawing Sheets

| ROUTING TABLE 156 | |
|---|---|
| DESTINATION ADDRESS 158 | OUTGOING PORT 160 |
| | |

REQUEST
PREPROCESSOR
154

SYSTEMS AND METHODS FOR PROVIDING DATA PACKET FLOW CONTROL

BACKGROUND OF THE INVENTION

Peripheral Component Interconnect (PCI) architecture is currently used to provide primary input/output (I/O) functionality in most classes of computers and servers. In addition, a PCI bus, which enables most I/O functionality, is one of the most widely utilized interconnects. In fact, the PCI bus still proves viable for most desktop computer functions. It should be noted that the term "computer" used herein refers to devices containing a processor and memory.

Unfortunately, devices using a standard PCI bus architecture may be quite limited in performance and reliability. A standard PCI bus architecture requires that devices connected to the PCI bus share a finite amount of bandwidth. In addition, as additional devices and/or ports are added to the PCI bus, the overall bandwidth afforded to each device proportionally decreases. Currently, multiple parallel signal routes are added at the PCI bus topology level to enable additional devices to share the PCI bus. The negative effect produced by the addition of parallel signal routes is a large I/O pin count that is required to enable proper device operation. Still further, servers are approaching and surpassing upper bandwidth limits of shared bus architectures, such as the PCI bus.

Figure 1:
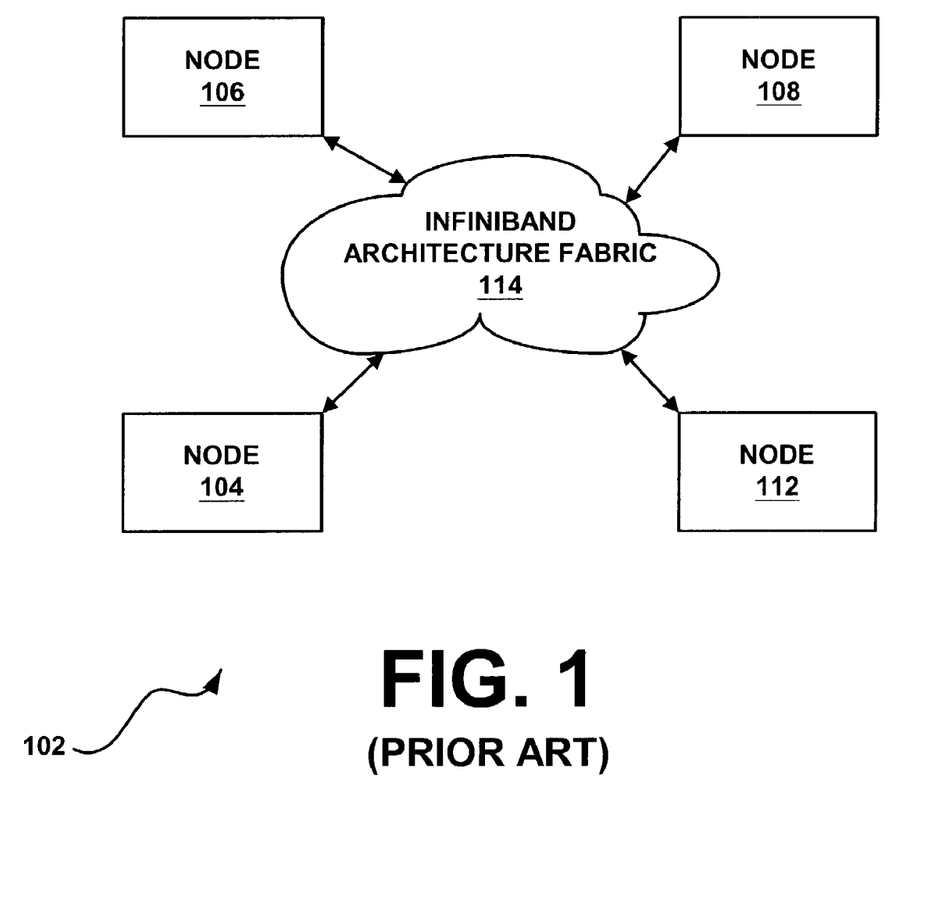
FIG. 1 is a block diagram illustrating a prior art IBA network.

To address the limitations associated with PCI architecture, InfiniBand architecture (IBA) was introduced. The IBA defines a switched communications fabric allowing multiple devices to concurrently communicate with high bandwidth and low latency in a protected and remotely managed environment. FIG. 1 is a block diagram illustrating a prior art IBA network 102. Four end nodes 104, 106, 108, 112 and an IBA fabric 114 are located within the IBA network 102. As known by those of ordinary skill in the art, an end node may represent a number of different devices, examples of which include, a processor end node, a router to a network, or an I/O device, such as a redundant array of independent disks (RAID) subsystem. The IBA fabric 114 comprises logical devices that utilize the IBA for communication.

Figure 2:
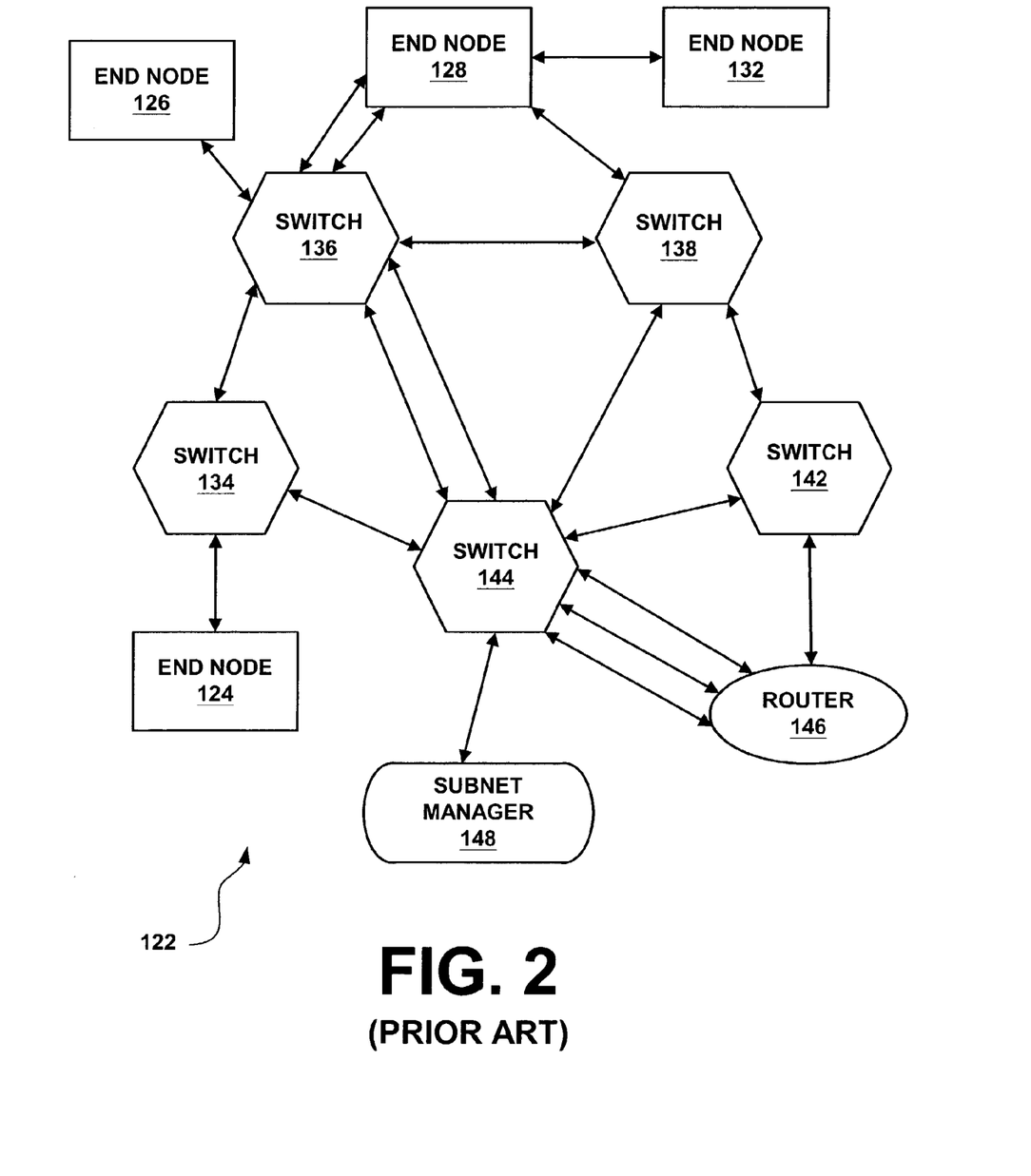
FIG. 2 is a block diagram illustrating a prior art subnet that may be located within the IBA network of FIG. 1.

The IBA network 102 may be subdivided into sub-networks, also referred to as subnets, that are interconnected by routers. Within the IBA network 102, end nodes may connect to a single subnet or multiple subnets. FIG. 2 is a block diagram illustrating a prior art subnet 122. The IBA subnet 122 of FIG. 2 contains end nodes 124, 126, 128, 132, switches 134, 136, 138, 142, 144, a router 146 and a subnet manager 148. Multiple links can exist between any two devices within the IBA subnet 122, an example of which is shown by connections between the router 146 and switch 144.

The switches 134, 136, 138, 142, 144 connect the end nodes 124, 126, 128, 132 for communication purposes. Each connection between an end node 124, 126, 128, 132 and a switch 134, 136, 138, 142, 144 is a point-to-point serial connection. Since the connections are serial, four separate connections are required to connect the end nodes 124, 126, 128, 132 to switches 134, 136, 138, as opposed to the requirement of a wide parallel connection used within a PCI bus. It should be noted that more than four separate connections are shown by FIG. 2 to provide examples of different connections within the IBA subnet. In addition, since each point-to-point connection is dedicated to two devices, such as an end node 124, 126, 128, 132 and a switch 134, 136, 138, 142, 144, the full bandwidth capacity of each connection is made available for communication between the two devices. This dedication eliminates contention for a bus, as well as delays that result from heavy loading conditions on a shared bus architecture.

The switches 134, 136, 138, 142, 144 transmit packets of data based upon a destination address, wherein the destination address is located in a local route header of a data packet. However, the switches 134, 136, 138, 142, 144 are not directly addressed in the traversal of packets within the IBA subnet 122. Instead, packets traverse switches 134, 136, 138, 142, 144 virtually unchanged. To this end, each destination within the IBA subnet 122 is typically configured with one or more unique local identifiers, which represent a path through a switch 134, 136, 138, 142, 144. Data packet forwarding by a switch 134, 136, 138, 142, 144 is typically defined by forwarding tables located within each switch 134, 136, 138, 142, 144, wherein the table in each switch is configured by the subnet manager 148. Each data packet contains a destination address that specifies the local identifier for reaching a destination. When individual data packets are received by a switch 134, 136, 138, 142, 144, the data packets are forwarded within the switch 134, 136, 138, 142, 144 to an outbound port or ports based on the destination local identifier and the forwarding table located within the switch 134, 136, 138, 142, 144.

The router 146 forwards packets based on a global route header located within the packet, and replaces the local route header of the packet as the packet passes from subnet to subnet. While intra-subnet routing is provided by the switches 134, 136, 138, 142, 144, the router 146 is the fundamental routing component for inter-subnet routing. Therefore, routers interconnect subnets by relaying packets between the subnets until the packets arrive at a destination subnet.

As additional devices, such as end nodes, are added to a subnet, additional switches are normally required to handle additional packet transmission within the subnet. However, it would be beneficial if additional switches were not required with the addition of end nodes, thereby reducing the expenditure of resources associated with the purchase of additional switches.

SUMMARY OF THE INVENTION

In light of the foregoing, the preferred embodiment of the present invention generally relates to systems and methods for providing data packet flow control, wherein for exemplary purposes, a switch is utilized.

Generally, with reference to the structure of the switch, the switch contains a series of ports, an arbiter and a hub. The arbiter determines an outgoing port, wherein the outgoing port is one port of the series of ports, for transmission of a data packet received by the switch, determines whether the outgoing port is available to receive the received data packet, and regulates transmission of the received data packet to a destination end node. The hub provides a point-to-point connection between any two of the series of ports and the arbiter.

The present invention can also be viewed as providing a method of providing data packet flow control. In this regard, the method can be broadly summarized by the following steps: determining a destination for a data packet received by a switch; determining an outgoing port of the switch to be used for transmitting the received data packet to the destination; determining if the outgoing port is capable of receiving the received data packet; determining if the destination for the received data packet is capable of receiving the received data packet; and transmitting the received data packet to the outgoing port if the outgoing port is capable of receiving the received data packet and if the destination for the received data packet is capable of receiving the received data packet.

Other systems, methods and advantages of the present invention will be or become apparent to one having ordinary skill in the art upon examination of the following drawings and detailed description. It is intended that all such additional systems, methods, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION

The present invention is a system and method that provides flow control of data packets. The system and method is capable of providing flow control of data packets within a network, such as, but not limited to, an InfiniBand (IB) network. As stated above, for exemplary purposes, the present description describes use of a switch for providing flow control of data packets within the IB network, and therefore, the switch is hereafter referred to as an IB switch. It should be noted, however, that it is not required that the switch be utilized in association with an IB network. In addition, due to structure of the IB switch, the IB switch may be easily modified to compensate for the addition of end nodes to the IB network, as well as added packet flow associated with the addition of end nodes. For purposes of simplicity, the following describes an IB subnet located within the IB network.

Figure 3:
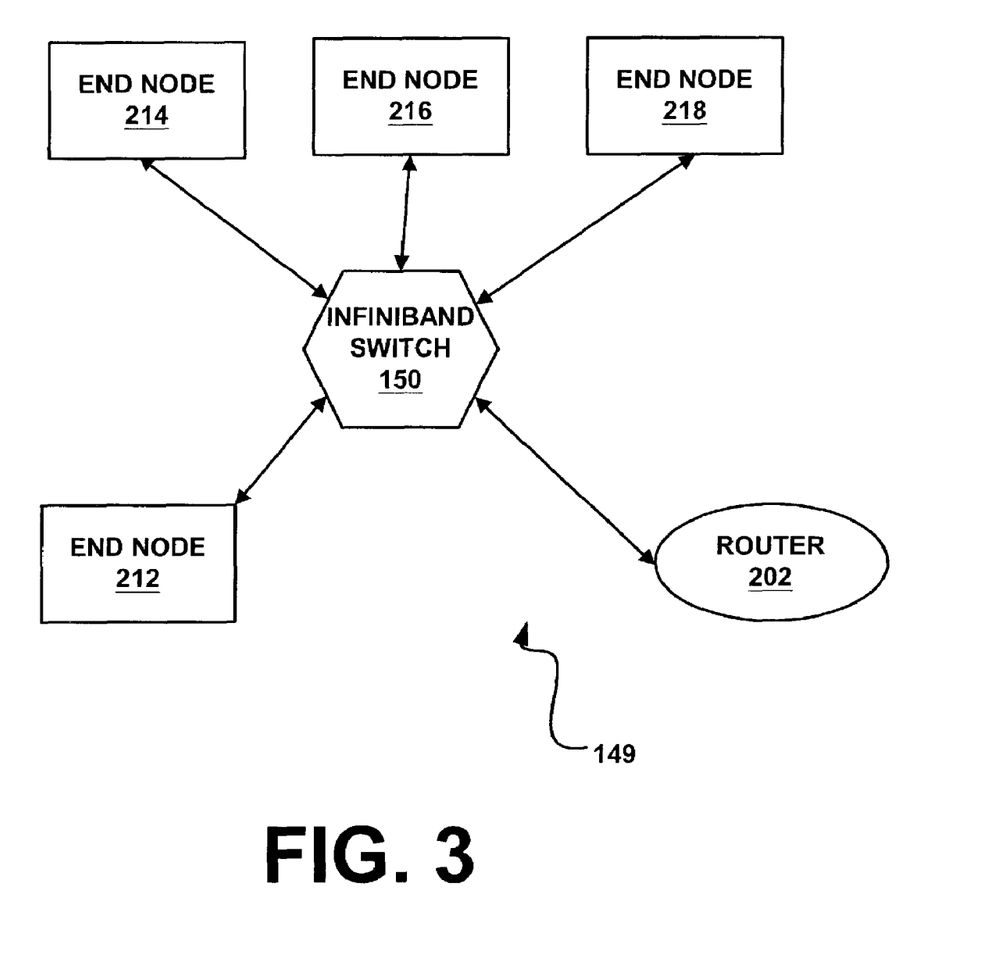
FIG. 3 is a block diagram illustrating an IB subnet having the present IB switch located therein.

FIG. 3 is a block diagram of an IB subnet 149 having IB switch 150 located therein. As shown by FIG. 3, the IB subnet 149 contains the IB switch 150, a router 202, and four end nodes 212, 214, 216, 218. It should be noted that more or fewer end nodes 212, 214, 216, 218 may be located within the subnet 149. The router 202 provides a connection from the subnet 149 to remote subnets for the transmission and reception of data packets. In addition, the end nodes 212, 214, 216, 218 may be any logical device that is located within an IB fabric. As an example, the end nodes 212, 214, 216, 218 may be processor nodes and/or I/O devices.

In accordance with the exemplary embodiment of the invention, the IB switch 150 is connected to each end node 212, 214, 216, 218 and the router 202. Due to the structure of the IB switch 150 and functionality performed therein, the IB switch 150 is capable of controlling the flow of data packets either from an end node 212, 214, 216, 218 to another end node 212, 214, 216, 218, from an end node 212, 214, 216, 218 to the router 202, or from the router 202 to an end node 212, 214, 216, 218. Flow control performed by the IB switch 150 is described in detail below.

Figure 4:
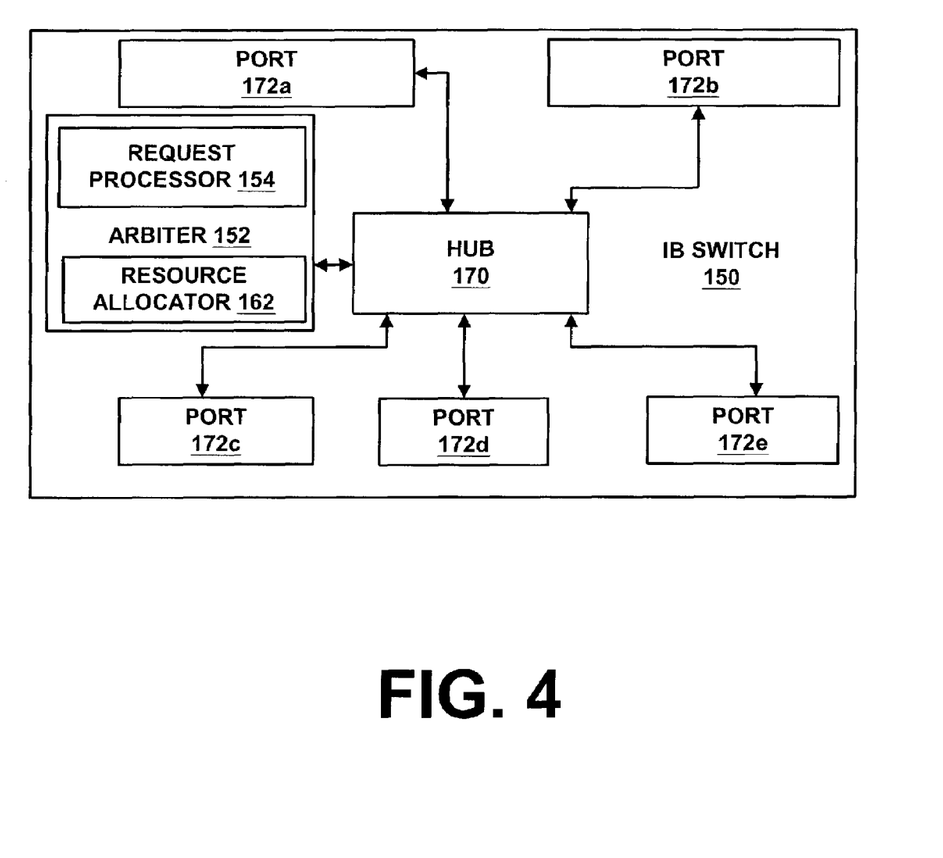
FIG. 4 is a block diagram further illustrating the IB switch of FIG. 3.

Referring now to the structure of the IB switch 150, FIG. 4 is a block diagram further illustrating the IB switch 150 of FIG. 3, in accordance with the exemplary embodiment of the invention. The IB switch 150 contains an arbiter 152, a hub 170, and a series of ports 172a through 172e (summarily referred to as 172). For exemplary purposes, five ports 172 are provided within the IB switch 150. It should be noted that more or fewer ports 172 may be located within the IB switch 150, depending upon the number of end nodes and routers connected to the IB switch 150. In accordance with the exemplary embodiment of the invention, the total number of ports 172 within the IB switch 150 is the same as the total number of end nodes and the total number of routers connected to the IB switch 150. Therefore, as end nodes are added to the IB subnet 149 (FIG. 3), ports 172 are also added to the switch 150. As a result, additional IB switches are not required to accommodate for additional end nodes. Instead, an additional port if added to accommodate an additional end node, as well as functionality for interaction within the IB switch 150, as is described below.

The IB switch 150 directs a data packet from a source end node to a destination end node, while providing data packet flow control, as described in detail below. As is known by those having ordinary skill in the art, a data packet contains at least a header portion, a data portion, and a cyclic redundancy code (CRC) portion. The header portion contains at least a source address portion, a destination address portion, a data packet size portion and a virtual lane identification number. In addition, prior to transmission of the data packet from an end node, a CRC value for the data packet is calculated and appended to the data packet. Further discussion of the header portion and the CRC portion is provided below.

The hub 170 interconnects ports 172a-172e, while the arbiter 152 controls interconnection between ports 172a-172e via the hub 170. Specifically, the hub 170 contains a series of wired point-to-point connections that are capable of directing data packets from one port 172 to another port 172, from port 172 to arbiter 152, and/or from arbiter 152 to port 172.

The arbiter 152 contains a request preprocessor 154 and a resource allocator 162. The request preprocessor 154 determines a port 172 within the IB switch 150 that is to be used for transmitting a received data packet to a destination end node. It should be noted that the port 172 to be used for transmitting received data packets to the destination end node is also referred to herein as the outgoing port. For exemplary purposes, the following assumes that the outgoing port is port 172d and that a source port is port 172a. To determine the outgoing port 172d, the request preprocessor 154 uses a destination address stored within the header of the received data packet to index a routing table located within the request preprocessor 154 and determine the outgoing port 172d for the received data packet. It should be noted that each port 172a-172e is capable of determining a destination address of a received data packet, as is described below. As is further explained below, the arbiter 152 also determines availability of the outgoing port 172*d* and regulates transmission of received data packets, via the IB switch 150, to a destination end node.

Figure 5:
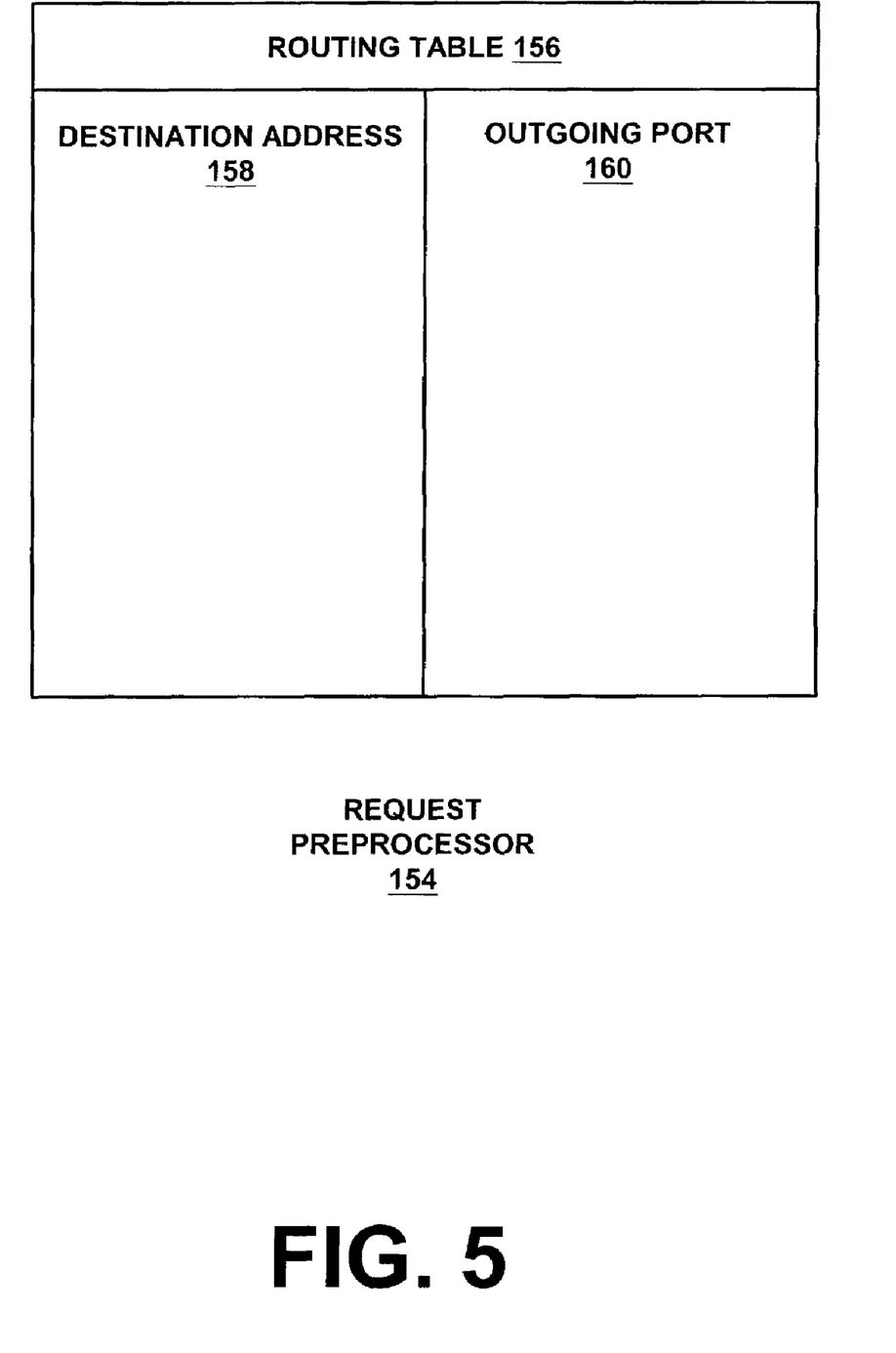
FIG. 5 is a block diagram further illustrating the routing table located within the IB switch of FIG. 4.

FIG. 5 is a block diagram further illustrating the routing table 156 located within the request preprocessor 154 (FIG. 4). As shown by FIG. 5, the routing table 156 contains a destination address column 158 and an outgoing port column 160. In accordance with the exemplary embodiment of the invention, the destination address column 158 contains IP addresses of destination end nodes stored therein. Destination end nodes may include, but are not limited to, end nodes located within the IB subnet 149 of FIG. 3 or end nodes located remote from the IB subnet 149 of FIG. 3.

The outgoing port column 160 contains the addresses of outgoing ports, which are selected from the ports 172*a*-172*e* (FIG. 4) located within the IB switch 150 (FIG. 4). Each destination address stored within the destination address column 158 is associated with an outgoing port address stored within the outgoing port column 160. Therefore, a search for a destination Internet protocol (IP) address within the destination address column 158 returns the address of an outgoing port 172*d* (FIG. 4) that is to be used during transmission of the received data packet to the destination IP address. It should be noted that additional tables may be located within the request preprocessor 154 that contain other port attributes, such as, but not limited to, rate of data packet transmission within the IB switch 150 (FIG. 4).

Returning to FIG. 4, the resource allocator 162 continuously monitors the status of ports 172*a*-172*e* within the IB switch 150. Specifically, the resource allocator 162 continuously monitors whether ports 172*a*-172*e* are presently receiving data packets via use of a first resource allocator memory. To monitor receipt of data packets by ports 172*a*-172*e*, the resource allocator 162 utilizes a series of monitoring tables located within the first resource allocator memory, wherein each monitoring table is associated with a single port 172.

Figure 6:
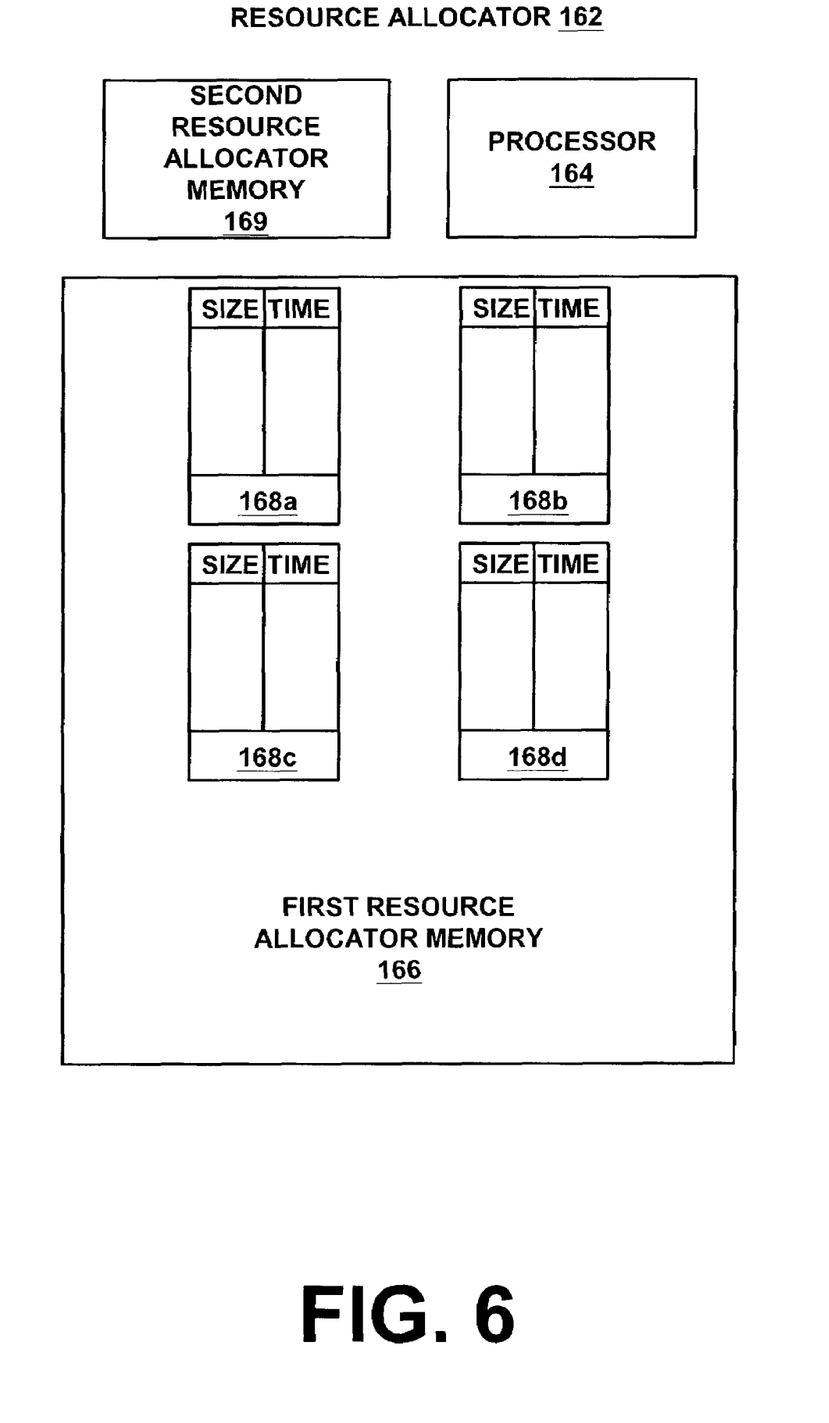
FIG. 6 is a block diagram illustrating an example of a resource allocator located within the IB switch of FIG. 4.

FIG. 6 is a block diagram illustrating the resource allocator 162 in accordance with the exemplary embodiment of the invention. As shown by FIG. 6, the resource allocator 162 contains a processor 164, a first resource allocator memory 166 and a second resource allocator memory 169. The processor 164 controls access to data stored within the first resource allocator memory 166. The first resource allocator memory 166 contains a series of monitoring tables 168*a*, 168*b*, 168*c*, 168*d* (summarily referred to as 168), wherein each monitoring table 168 stores data describing properties of a single port 172 (FIG. 4). Each monitoring table 168 contains a packet size column and a time of transmission column. The packet size column stores the size of the last data packet transmitted to the port 172 (FIG. 4), while the time of transmission column stores the time of transmission of the last data packet to the port 172 (FIG. 4).

Since the size of the last data packet transmitted, the time of transmission, and the rate of data packet transmission are known, the processor 164 is capable of determining when an outgoing port 172*d* (FIG. 4) has completed receipt of the last transmitted data packet. Therefore, the resource allocator 162 is capable of determining if an outgoing port 172*d* (FIG. 4) is receiving data packets when queried, and as a result, whether the outgoing port 172*d* (FIG. 4) is capable of receiving additional data packets when queried.

The resource allocator 162 is also capable of determining if an outgoing port 172*d* (FIG. 4) contains adequate memory space for receipt of a received data packet. Specifically, to determine if a destination end node will receive data packets from the IB switch 150 (FIG. 4), the processor 164 compares memory requirements for the received data packet to memory presently available for storage within the outgoing port 172*d* (FIG. 4). Since the resource allocator 162 stores the size of the last transmitted data packet for each outgoing port 172*d* (FIG. 4) within the packet size column, the resource allocator 162 can determine if an outgoing port 172*d* (FIG. 4) has adequate memory space for receipt of a received data packet. If the resource allocator 162 determines that adequate storage space for receipt of a received data packet is not available within the outgoing port 172*d* (FIG. 2), the resource allocator 162 does not allow the source port 172*a* (FIG. 4) to transmit the received data packet to the outgoing port 172*d* (FIG. 4). It should be noted that, as is further discussed below, the source port 172*a* (FIG. 4) temporarily storing the received data packet does not transmit the received data packet to the outgoing port 172*d* (FIG. 4) until the source port 172*a* (FIG. 4) and the outgoing port 172*d* (FIG. 4) receive a grant word from the resource allocator 162.

A flow control update packet is periodically transmitted by a destination end node and received by the IB switch 150 (FIG. 4). Specifically, a port 172 (FIG. 4) connected to the destination end node, which may be the destination port 172*d* (FIG. 2), receives the flow control update packet. The destination end node transmits the flow control update packet to the connected port 172 (FIG. 4), thereby informing the IB switch 150 (FIG. 4) of internal storage capability of the destination end node. The resource allocator 162 preferably reviews data received by the flow control update packets prior to transmission of the grant word to the source port 172*a* (FIG. 4) and the outgoing port 172*d* (FIG. 4).

Each flow control update packet contains at least a virtual lane number, a flow control total blocks sent (FCTBS) number and a flow control credit limit (FCCL) number. The virtual lane number identifies a path to a memory located within a port 172 for receipt of data packets from a destination end node. Virtual lanes are further described below with reference to structure of a port 172 (FIG. 4).

The FCTBS number is a count of the number of blocks of data packets that have been transmitted by the port 172 (FIG. 4) connected to the destination end node. As such, the FCTBS number is provided by the arbiter 152 (FIG. 4) and is continuously updated by the arbiter 152 (FIG. 4) each time a data packet is transmitted by the outgoing port 172*d* (FIG. 4).

The FCCL number is added to the flow control update packet by the destination end node to inform the arbiter 152 (FIG. 4) of presently available memory space within the destination end node. A measure of the available memory space within the destination end node may be stored within the second resource allocator memory 169 for future comparison purposes by the IB switch 150 (FIG. 4). As an example, in accordance with the exemplary embodiment of the invention, the resource allocator 162 compares the size of a received data packet that is to be transmitted to a destination end node, to the available memory space within the destination end node, as portrayed by flow control update packets.

It should also be noted that the flow control update packets are periodically transmitted to the resource allocator 162. In addition, the measure of the available memory space within the destination end node is updated by the resource allocator 162 each time the resource allocator 162 transmits a grant word, thereby maintaining accuracy of destination end node memory availability. Further discussion of the resource allocator 162 is provided below.

The grant word is transmitted by the resource allocator 162 to the source port 172a (FIG. 4) and the outgoing port 172d (FIG. 4) after assuring that the outgoing port 172d (FIG. 4) has adequate storage space for receipt of the received data packet, and assuring that the destination end node contains adequate memory availability to receive the data packet.

Figure 7:
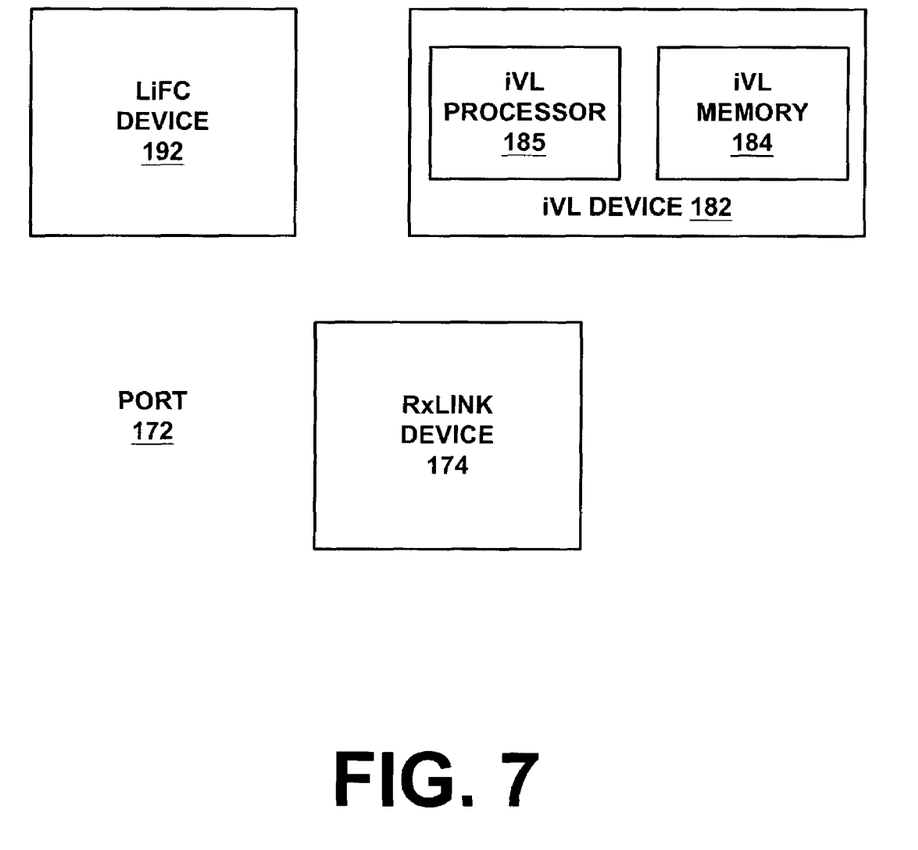
FIG. 7 is a block diagram further illustrating a port located within the IB switch of FIG. 4

FIG. 7 is a block diagram further illustrating a port 172 in accordance with the first embodiment of the invention. Each port 172a-172e (FIG. 4) within the IB switch 150 (FIG. 4) contains a receive link (RxLink) device 174, an input virtual lane (iVL) device 182 and a link flow control (liFC) device 192. It should be noted that each port 172a-172e (FIG. 4) located within the IB switch 150 (FIG. 4) contains the same components as other ports 172a-172e (FIG. 4) located within the IB switch 150 (FIG. 4).

The RxLink device 174 analyzes a data packet received by the IB switch 150 (FIG. 4) to determine the destination address of the received data packet and the CRC value of the received data packet. As is known by those having ordinary skill in the art, the destination address of the data packet is determined by analyzing the header of the received data packet. In accordance with the exemplary embodiment of the invention, the destination address is an IP address, although other forms of addresses may also be used. It should be noted that RxLink device 174 is also capable of determining the size of the received data packet during analysis of the header.

The CRC value of the received data packet is determined by analyzing the CRC portion of the received data packet. As mentioned above, prior to transmission of a data packet, a CRC value is calculated for the data packet and appended to the data packet.

The RxLink device 174 also performs a CRC qualification check on data packets received by the port 172. To perform the CRC qualification check, the RxLink device 174 determines a CRC value for the received data packet and compares the determined CRC value with the CRC value obtained from the CRC portion of the data packet. It should be noted that methods for determining a CRC value are well known by those having ordinary skill in the art. Therefore, a description of how to determine a CRC value is not provided herein. If the CRC value appended to the received data packet is not the same as the CRC value calculated by the RxLink device 174, then the physical medium used for transmission of the received data packet has introduced an error to the received data packet. A received data packet having an error(s) therein may be dropped by the RxLink device 174, or marked as a "bad" data packet.

When a data packet is received by the port 172, the iVL device 182 temporarily stores the data packet within an iVL memory 184. The iVL memory 184 contains a series of virtual lanes. As is known by those having ordinary skill in the art, a virtual lane is a unique logical communication link that shares a single physical link. In accordance with the exemplary embodiment of the invention, each physical link can have up to fifteen virtual lanes and a management lane, wherein the virtual lanes may be prioritized and numbered. It should be noted that the availability of fifteen virtual lanes is described in the *InfiniBand Architecture Specification*, vol. 1, release number 1.0.a, Jun. 19, 2001, the disclosure of which is hereby incorporated by reference in its entirety. Alternatively, more or fewer virtual lanes may be utilized.

As a data packet traverses the IB subnet 149 (FIG. 3), a device such as, but not limited to, an end node, switch, and/or router, may provide the data packet with a virtual lane priority or service level. Data packets having a higher virtual lane priority are handled by the arbiter 152 (FIG. 4) prior to data packets having a lower virtual lane priority. Therefore, depending on outgoing port availability, data packets having a higher virtual lane priority may be transmitted by the IB switch 150 (FIG. 4) prior to data packets having a lower virtual lane priority.

Access to the iVL memory 184 may be regulated by the RxLink device 174 and the liFC device 192. Specifically, the RxLink device 174 determines the size of a received data packet having a virtual lane priority. In addition, as is explained below, the liFC device 192 keeps track of space available within each virtual lane. The RxLink device 174 compares the size of a received data packet to space available within a virtual lane identified by the data packet to determine if the received data packet will fit within the identified virtual lane of the iVL memory 184.

Assuming that the data packet is allowed access to the iVL memory 184, analysis of the received data packet, including, for example, performing the CRC qualification check, determining the outgoing port to be used for transmission of the data packet to the destination address and determining if the destination end node has adequate memory space to receive the data packet, is performed while the received data packet is stored within the iVL memory 184.

If the outgoing port 172d (FIG. 4) for the received data packet, as determined by the resource allocator 162 (FIG. 6), contains adequate memory space and the destination end node contains adequate memory space, the iVL device 182 located within the source port 172a (FIG. 4) will receive the grant packet from the resource allocator 162 (FIG. 6). After receiving the grant packet from the resource allocator 162 (FIG. 6), the received data packet is transmitted to the outgoing port 172d (FIG. 4) identified by the resource allocator 162 (FIG. 6) and, thereafter, to the destination end node specified by the header of the received data packet.

The liFC device 192 monitors data and tables within the IB switch 150 (FIG. 4) that are used for flow control update generation. In addition, the liFC device 192 generates flow control updates for transmission to ports located remote from the IB switch 150. Flow control updates may be transmitted to ports located remote from the IB switch 150 to inform an end node transmitting data packets to the IB switch 150 (FIG. 4) how much of the iVL memory 184 is available within the iVL device 182 prior to transmission of the data packets.

Figure 8:
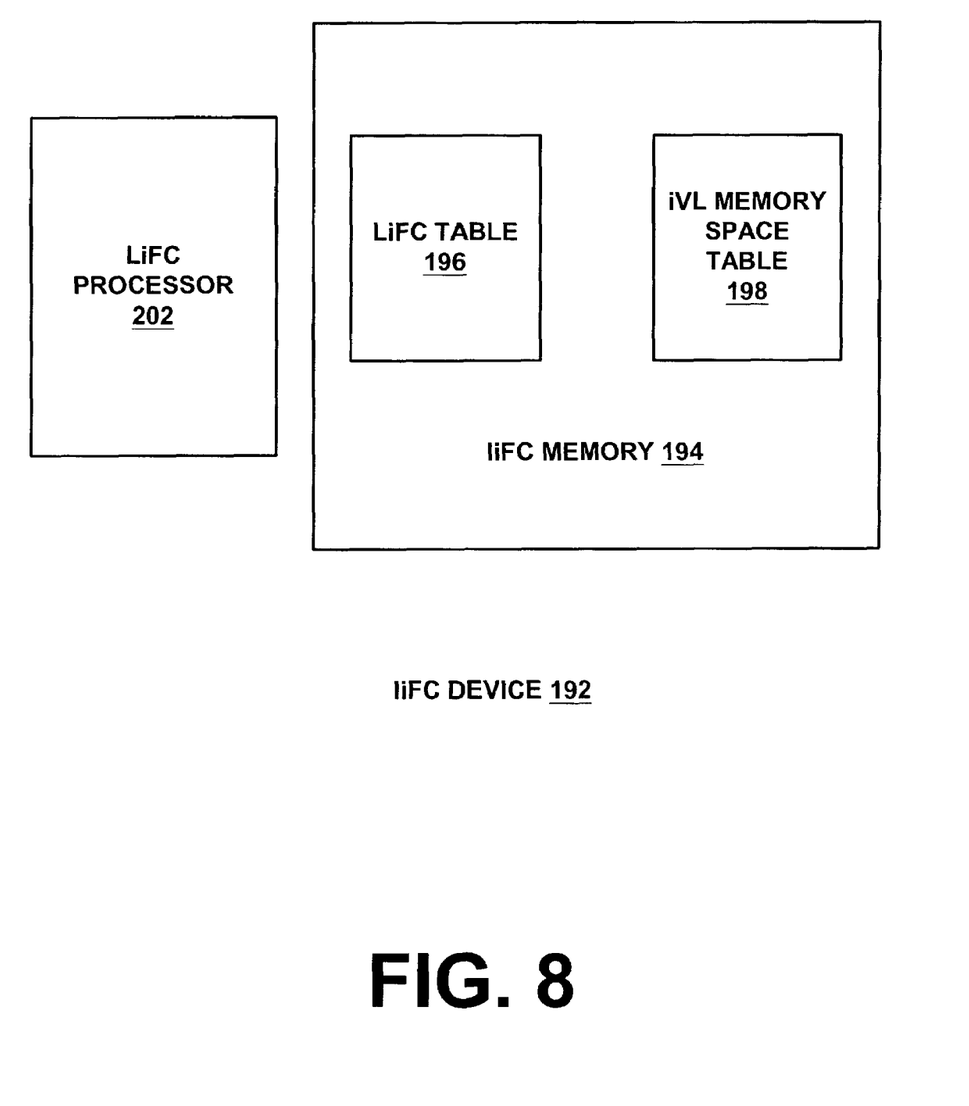
FIG. 8 is a block diagram further illustrating an liFC device located within the port of FIG. 7.

FIG. 8 is a block diagram further illustrating the liFC device 192. The liFC device 192 contains an liFC memory 194 and an liFC processor 202. The liFC memory 194 contains an liFC table 196 and an iVL memory space table 198. The liFC table 196 is used for storing information within flow control updates received from destination end nodes. Information within flow control updates may include, but is not limited to, the FCCL number, which specifies memory space available within the destination end node.

The iVL memory space table 198 stores the name of each virtual lane within the iVL memory 184 (FIG. 7). In addition, the iVL memory space table 198 stores the amount of memory space available within each named virtual lane.

Figure 9:
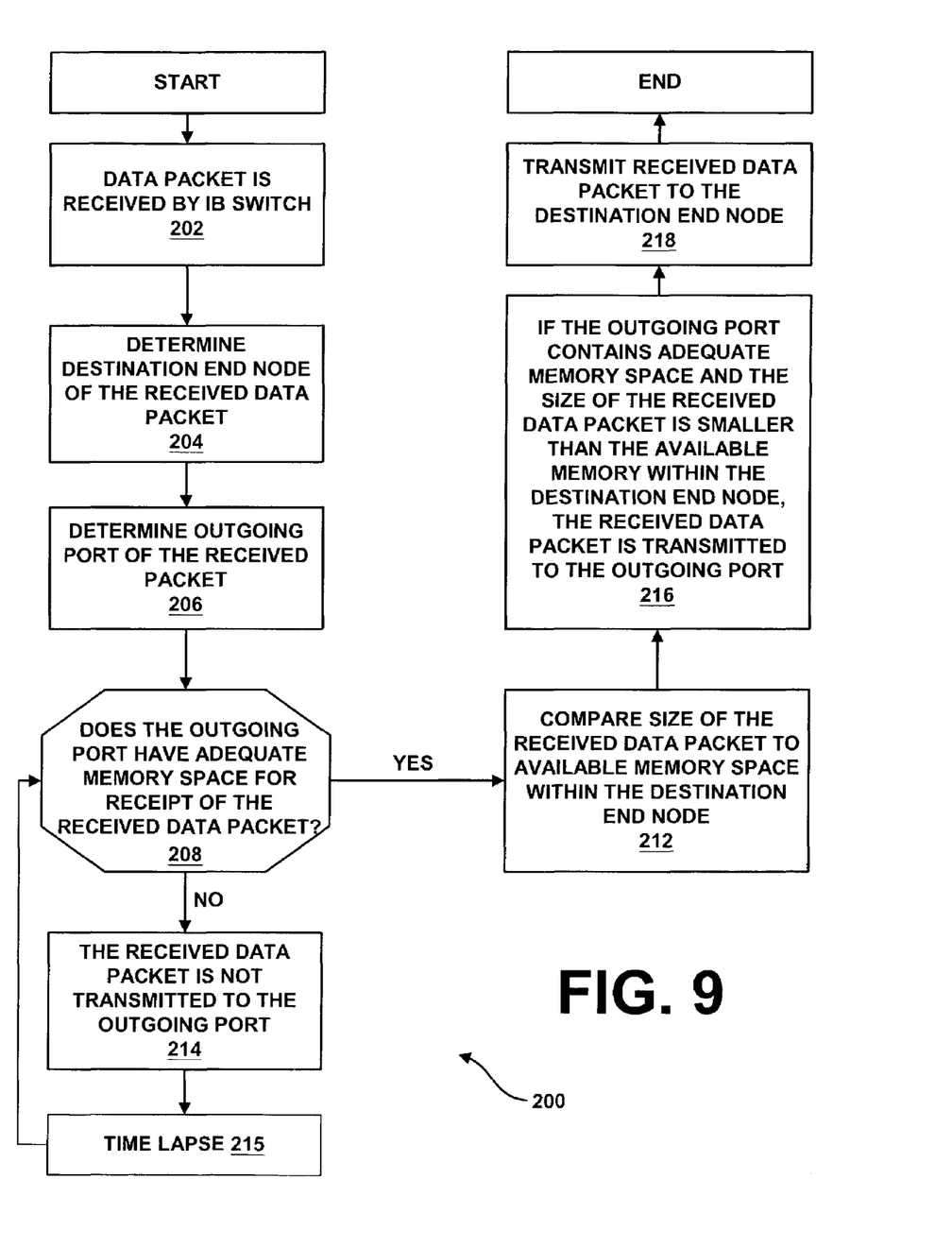
FIG. 9 is a flowchart illustrating functionality performed by the IB switch of FIG. 4.

FIG. 9 is a flowchart 200 illustrating functionality performed by the IB switch 150 (FIG. 4) upon receipt of a data packet. It should also be noted that in some alternative implementations, the functions noted in the blocks may occur out of the order noted. For example, two blocks shown in succession may in fact be executed substantially concurrently, or the blocks may sometimes be executed in the reverse order, depending upon the function performed.

As shown by block 202, a data packet is received by an IB switch 150 (FIG. 4). A header of the data packet is inspected to determine a destination end node of the received data packet (block 204). An outgoing port 172d (FIG. 4) for transmission of the received data packet prior to transmission to the destination end node is determined (block 206). As shown by block 208, a determination is made as to whether the outgoing port 172d (FIG. 4) contains adequate memory space to receive the data packet received by the IB switch. If adequate memory space is located within the outgoing port 172d (FIG. 4), the size of the received data packet is compared to available memory space within the destination end node (block 212). Alternatively, if adequate memory space is not located within the outgoing port 172d (FIG. 4), the received data packet is not transmitted to the outgoing port 172d (FIG. 4) (block 214). As shown by block 215, after a predetermined period of time, a determination may again be made as to whether the outgoing port 172d (FIG. 4) contains adequate memory space to receive the data packet received by the IB switch (block 208).

If the outgoing port 172d (FIG. 4) contains adequate memory space to receive the data packet received by the IB switch 150 (FIG. 4) and the size of the received data packet is smaller than the available memory within the destination end node, the received data packet is transmitted to the outgoing port 172d (FIG. 4) (block 216). The outgoing port 172d (FIG. 4) may then transmit the received data packet to the destination end node (block 218).

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A method of providing data packet flow control in a switch, the method comprising:
    determining a destination for a data packet received by the switch;
    determining an outgoing port of said switch to be used for transmitting said received data packet to said destination;
    providing a memory in which is stored a first monitoring table containing a last data packet transmission property of said outgoing port;
    using the monitoring table for determining if said outgoing port is capable of receiving said received data packet;
    determining if said destination for said received data packet is capable of receiving said received data packet; and
    transmitting said received data packet to said outgoing port if said outgoing port is capable of receiving said received data packet and if said destination for said received data packet is capable of receiving said received data packet.

2. The method of claim 1, wherein the transmission property of said outgoing port includes a time of transmission of the last data packet to said outgoing port.

3. The method of claim 2, further comprising the step of generating a flow control update for transmission to a remote end node, wherein said flow control update specifies an amount of memory available within said switch for storing said received data packet.

4. The method of claim 1, wherein the transmission property of said outgoing port includes a time of transmission of the last data packet to said outgoing port, a packet size of the last data packet transmitted to said outgoing port, and a rate of data packet transmission.

5. A system for providing data packet flow control, comprising:
    means for determining a destination of a data packet received by a switch;
    means for determining an outgoing port of said switch to be used for transmitting said received data packet to said destination;
    means for storing a last data packet transmission property of said outgoing port;
    means for using the property for determining if said outgoing port is capable of receiving said received data packet;
    means for determining if said destination for said received data packet is capable of receiving said received data packet; and
    means for transmitting said received data packet to said outgoing port if said outgoing port is capable of receiving said received data packet and if said destination for said received data packet is capable of receiving said received data packet.

6. The system of claim 5, further comprising means for temporarily storing said received data packet prior to transmitting said received data packet to said destination.

7. The system of claim 5, wherein said means for determining a destination address of said received data packet further comprises:
    means for determining a cyclic redundancy code value of said received data packet;
    means for comparing said determined cyclic redundancy code value to a cyclic redundancy code value attached to said received data packet; and
    means for dropping said received data packet if said determined cyclic redundancy code value is different than said cyclic redundancy code value attached to said received data packet.

8. The system of claim 5, further comprising means for generating a flow control update for transmission to a remote end node, wherein said flow control update specifies an amount of memory available within said switch for storing said received data packet.

9. The system of claim 5, further comprising means for analyzing a header of said received data packet.

10. The system of claim 5, further comprising means for determining if said outgoing port is currently receiving data packets.

11. A switch for providing data packet flow control, the switch comprising:
    a first port;
    a second port;
    a hub operable to provide a connection for data packet flow between the first and second ports; and
    an arbiter device communicatively coupled to the hub, the arbiter device comprising:
        a request preprocessor; and
        a resource allocator comprising a first resource allocator memory in which is stored a first monitoring table containing data describing a property of the first port, and a second monitoring table containing data describing a property of the second port, and wherein the property of the first port comprises one of a) a packet size of the last data packet transmitted to the first port and b) a time of transmission of the last data packet to the first port.

12. The switch of claim 11, wherein the property of the second port comprises one of a) a packet size of the last data packet transmitted to the second port and b) a time of transmission of the last data packet to the second port.

13. The switch of claim 11, wherein the property of the first port further comprises a rate of data packet transmission.

14. The switch of claim 13, wherein the resource allocator further comprises a processor configured to use the property of the first port to determine receipt of the last data packet transmitted to the first port and thereby determine whether the first port is capable of receiving an additional data packet.

15. The switch of claim 13, wherein the first port is a source port; the second port is an outgoing port; and the resource allocator further comprises a processor configured to use the property of the outgoing port to determine whether the outgoing port is capable of receiving a data packet from the source port.

16. The switch of claim 13, wherein the first port comprises a receive link (RxLink) device, an input virtual lane (iVL) device and a link flow control (liFC) device.

17. The switch of claim 16, wherein the RxLink device is configured to drop a received data packet upon failure of a CRC qualification check.

18. The switch of claim 16, wherein the liFC device comprises an liFC table for storing information contained in a flow control update received from a destination node.

19. The switch of claim 18, wherein the flow control update includes a flow control credit limit (FCCL) number that specifies the amount of memory space available in the destination node.

* * * * *